Jan. 5, 1937.   G. DÉSAGNAT   2,066,964
PROCESS OF MAKING TILE STRUCTURES
Filed Nov. 12, 1934   2 Sheets-Sheet 1

Jan. 5, 1937.    G. DÉSAGNAT    2,066,964
PROCESS OF MAKING TILE STRUCTURES
Filed Nov. 12, 1934    2 Sheets—Sheet 2

Inventor:
G. Desagnat
By: Glascock Downing Seebolt
Attys.

Patented Jan. 5, 1937

2,066,964

UNITED STATES PATENT OFFICE 2,066,964

PROCESS OF MAKING TILE STRUCTURES

Gaston Désagnat, Paris, France

Application November 12, 1934, Serial No. 752,742
In France November 21, 1933

1 Claim. (Cl. 25—154)

This invention relates to a flexible covering for walls, ceilings, floors and the like, composed of small moulded plates made of plastic material and secured on a flexible substratum such as wire gauze or textile fabric, and to the process for manufacturing it.

The feature of the covering according to the invention consists in that the substratum is imbedded in the back part of the moulded plates.

The process for manufacturing this covering consists in introducing the plastic material in a mould divided into compartments the shape of which corresponds to that of the plates to be moulded and in filling up this mould a little above its edges, in applying and pressing on the plastic material contained in the mould a flexible fabric in such a manner that it rests on the edges of the mould and of the compartments of the latter, whilst the material in excess passes through this fabric and over its upper face, in causing a scraper to slide on the upper face of said fabric for removing the excess of plastic material and in withdrawing, after the material has hardened, the substratum with the plates adhering thereto.

The covering and the process according to the invention will now be described with reference to the accompanying drawing, given by way of example, and in which.

The object is to form, on a flexible substratum 14, small plates 13, made of plastic material, placed edge to edge, but separated, in order to allow the substratum to be bent according to their junction lines.

Figure 1:
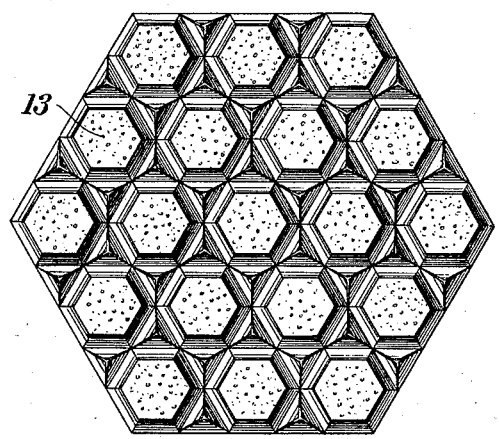
Figs. 1 and 2 are a front view and a section, respectively, of a portion of covering obtained by the process according to the invention.
Figure 2:
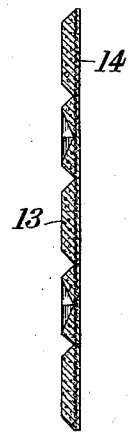
Figure 3:
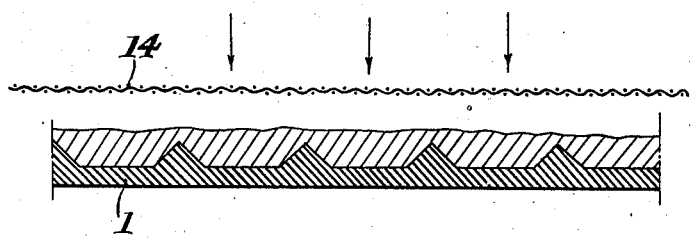
Figs. 3, 4, 5 and 6 illustrate different phases of the process.
Figure 4:
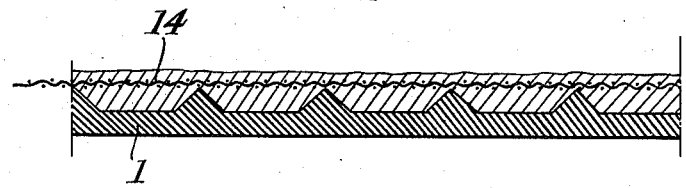

For that purpose, use is made of a mould 1 (Fig. 3) divided into compartments each of which has the shape of one of the plates of the covering to be manufactured. This mould is filled up with plastic material a little above its edge, as clearly shown in Fig. 3, and the flexible substratum 14 is applied on this material by exerting a pressure on the same in such a manner that the plastic material passes through the meshes and over the top of the substratum and that the latter comes in contact with the upper edges of all the compartments, as shown in Fig. 4.

Figure 5:
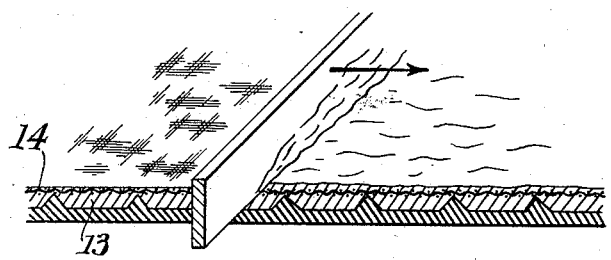

As the layer of material having an irregular surface cannot be left on the back of the covering, a rectilinear scraper 2 (Fig. 5) is passed over the substratum so as to remove the plastic material in excess. It results therefrom that the rear face of the covering becomes plane and smooth and that the substratum will remain impregnated with plastic material in an amount just sufficient for ensuring adherence between the plates and this substratum.

Figure 6:
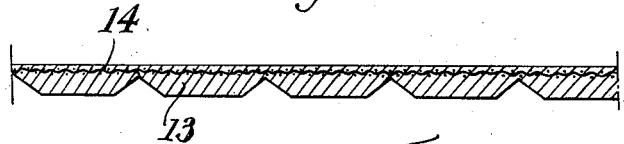

Fig. 6 shows the covering removed from the mould.

Owing to the fact that the substratum rested on the edges of the compartments of the mould during manufacture, the very narrow portions of substratum comprised between the plates 13 are bare or covered with a very thin layer of material which breaks immediately it is bent. The small plates are then connected together only by the substratum.

I claim:

A process for the manufacture of a flexible covering for walls and the like, composed of small separated moulded plates made of plastic material, and secured on a flexible substratum of suitable fabric, consisting in introducing the plastic material in a mould divided into a plurality of cavities, the shape of which corresponds to that of the small plates to be moulded, in filling up this mould with said material a little above its edges, in causing a rectilinear scraper to slide on the edges of the mould for removing the excess of plastic material, in applying and pressing on the scraped surface of the plastic material a flexible fabric so that it rests on the edges of the mould and of the cavities of said mould and that the material enters the meshes of said fabric, and in removing, after the material has hardened, the substratum with the plates adhering thereto.

GASTON DÉSAGNAT.